United States Patent
Maric et al.

(10) Patent No.: US 9,973,970 B2
(45) Date of Patent: May 15, 2018

(54) IMPROVING DATA RATES OF SHORT MESSAGE NOISY NETWORK CODING AND DECODE-AND FORWARD RELAYING

(71) Applicant: TELEFONAKTIEBOLAGET LM ERICSSON (PUBL), Stockholm (SE)

(72) Inventors: Ivana Maric, Sunnyvale, CA (US); Dennis Hui, Sunnyvale, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 37 days.

(21) Appl. No.: 15/038,798

(22) PCT Filed: Nov. 25, 2014

(86) PCT No.: PCT/IB2014/066335
§ 371 (c)(1),
(2) Date: May 24, 2016

(87) PCT Pub. No.: WO2015/079386
PCT Pub. Date: Jun. 4, 2015

(65) Prior Publication Data
US 2017/0164232 A1    Jun. 8, 2017

Related U.S. Application Data

(60) Provisional application No. 61/908,806, filed on Nov. 26, 2013.

(51) Int. Cl.
H04B 7/155    (2006.01)
H04W 28/06    (2009.01)
H04W 84/18    (2009.01)

(52) U.S. Cl.
CPC ........ H04W 28/06 (2013.01); H04B 7/15521 (2013.01); H04W 84/18 (2013.01)

(58) Field of Classification Search
CPC ... H04W 28/06; H04W 84/18; H04B 7/15521
See application file for complete search history.

(56) References Cited

U.S. PATENT DOCUMENTS

2007/0297498 A1 * 12/2007 Kramer .............. H04B 7/15557
                                                           375/211
2009/0175214 A1 *  7/2009 Sfar .................. H04B 7/15592
                                                           370/315
2010/0110970 A1     5/2010 Hwang
(Continued)

OTHER PUBLICATIONS

Cover, T. and A. El Gamal; "Capacity Theorems for the Relay Channel", IEEE Trans. Information Theory, vol. 25, No. 5, Sep. 1979.

(Continued)

Primary Examiner — Kenneth Lam

(57) ABSTRACT

A method for communicating data in a network node is disclosed. A data transmission is received from a first network node at a second network node. The first network node is configured to perform decode-and-forward operations and the second network node configured to perform compression operations. A compression index to be used for conveying the data transmission is generated. The generated compression index is encoded using superposition coding. The compression index is sent to at least the first network node.

22 Claims, 13 Drawing Sheets

(56) References Cited

U.S. PATENT DOCUMENTS

| | | | | |
|---|---|---|---|---|
| 2010/0157901 A1* | 6/2010 | Sanderovitz | ............ | H04B 7/022 370/328 |
| 2013/0022088 A1* | 1/2013 | Hatefi | .................... | H04L 1/004 375/211 |
| 2014/0171094 A1* | 6/2014 | Noh | ...................... | H04W 40/22 455/452.1 |
| 2014/0226699 A1* | 8/2014 | Kim | ......................... | H04B 7/15 375/211 |

OTHER PUBLICATIONS

Lim, S. H., Y-H. Kim, A. El Gamal and S-Y. Chung, "Noisy Network Coding", IEEE Trans. Information Theory, vol. 57, No. 5, May 2011.

Hou, J. and G. Kramer, "Short Message Noisy Network Coding", subm. To IEEE Trans. Information Theory, Apr. 2013.

Avestimehr, A., S. Diggavi, and D. Tse, "Wireless network information flow: A deterministic approach," IEEE Trans. Information Theory, vol. 57, No. 4, pp. 1872-1905, Apr. 2011.

Kramer, G., M. Gastpar, and P. Gupta, "Cooperative strategies and capacity theorems for relay networks," IEEE Trans. Information Theory, vol. 51, No. 9, pp. 3037-3063, Sep. 2005.

Cover, T. and J. Thomas, Elements of Information Theory, John Wiley Sons, Inc., Aug. 26, 1991.

Arash Behboodi, et al.; "Selective coding strategy for unicast composite networks," Information Theory Proceedings (ISIT), 2012 IEEE International Symposium on, IEEE, Jul. 1, 2012, pp. 1321-1325.

Jinfeng Du, et al., "Short-message noisy network coding with partial source cooperation," Information Theory Norkshop (ITW), 2012 IEEE, Sep. 3, 2012, pp. 144-147.

Sung Hoon Lim, et al., "Noisy Network Coding," IEEE Transactions on Information Theory, IEEE Press, USA, May 1, 2011, pp. 3132-3152.

Arash Behboodi, et al.; "Selective coding strategy for composite relay channels," Communications Control and Signal Processing (ISCCSP), 2012 5th International Symposium on, IEEE, May 2, 2012.

Yiwei Song, et al., "A lattice compress-and-forward scheme," Information Theory Workshop (ITW), 2011 IEEE, Oct. 16, 2011, pp. 110-114.

El Soussi Mohieddine, et al., "Compute-and-Forward on a Multi-access Relay Channel: Coding and Symmetric-Rate Optimization," IEEE Transactions on Wireless Communications, IEEE Service Center, Piscataway, NJ, US, Apr. 1, 2014.

Maric, et al., "Short Message Noisy Network Coding with Rate Splitting," Dec. 19, 2014, pp. 1-5.

* cited by examiner

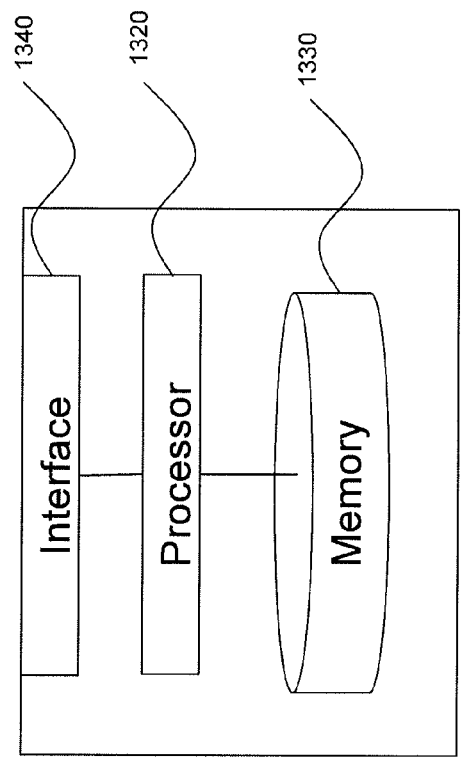

IMPROVING DATA RATES OF SHORT MESSAGE NOISY NETWORK CODING AND DECODE-AND FORWARD RELAYING

RELATED APPLICATIONS

This application is a 371 of PCT/IB2014/066335, filed Nov. 25, 2014, which claims the benefit of U.S. Provisional Application No. 61/908,806, filed Nov. 26, 2013, the disclosures of which are fully incorporated herein by reference.

TECHNICAL FIELD

The present disclosure pertains to relaying messages in wireless communications networks, and more particularly, to improving data rates of short message noisy network coding and decode-and-forward relaying.

BACKGROUND

To cope with the exponential growth in wireless data traffic it is anticipated that substantially denser deployment of base stations or wireless access nodes will be required in the future. The feasibility of a very dense deployment of wireless access nodes is predicated on the existence of a backhaul network that can provide high-data-rate transport for each individual access node in the network. From the point of view of maximizing capacity, optical-fiber-based backhaul solutions may be the most desirable ones, and may be most suitable for new constructions. However, in existing buildings and infrastructure, the cost of installation of new fibers to every access node in a very dense network can be prohibitive.

An alternative is the wireless self-backhaul solution, where the same access spectrum is used to provide transport. With self-backhauling, an access node serves not only its own assigned user equipment (UE or UEs) in its vicinity but also its neighboring access nodes as a relaying node in order to transfer data towards and/or from an information aggregation node in the network. A group of self-backhauling access nodes can form a multi-hop wireless mesh network. Access nodes may cooperatively transfer each other's traffic to and from the aggregation node.

SUMMARY

According to certain embodiments, a method for communicating data in a network node is disclosed. A data transmission is received from a first network node at a second network node. The first network node is configured to perform decode-and-forward operations and the second network node configured to perform compression operations. A compression index to be used for conveying the data transmission is generated. The generated compression index is encoded using superposition coding. The compression index is sent to at least the first network node.

In certain embodiments, in generating a compression index to be used for conveying the data transmission, network nodes performing decode-and-forward operation may be determined, two or more channel coding rates each corresponding to a component codebook of a superposition code may be determined, and the data transmission may be quantized using a vector quantization scheme at a quantization rate that is consistent with a sum of the two or more channel coding rates. In certain embodiments, in determining two or more channel coding rates each corresponding to a component codebook of a superposition code, at least one channel coding rate may be determined that is able to be decoded by the first network node. In certain embodiments, in encoding, using superposition coding, the generated compression index, the compression index may be divided into two or more component compression indices, and each of the two or more component compression indices may be encoded according to one of at least two or more determined channel coding rates. In certain embodiments, each of the determined channel coding rates corresponds to a component codebook of the superposition code. In certain embodiments, at least one of the determined channel coding rates is able to be decoded by the first network node. In certain embodiments, the two or more channel coding rates may be determined based at least in part on channel gains in the network. In certain embodiments, the first and second network nodes are relay nodes in a multi-hop wireless mesh network.

Also disclosed is a method for data transmission in a network node. A compression index from a second network node is received at a first network node. The first network node is configured to perform decode-and-forward operations, and the compression index includes two or more component compression indices. Each of the two or more component compression indices is encoded according to one of at least two or more determined channel coding rates, each determined channel coding rate corresponding to a component codebook of a superposition code. At least one of the two or more component compression indices of the received compression index is decoded.

Also disclosed is a method in a network node. Channel gain information is received from one or more network nodes in a wireless network. An optimal set of channel coding rates is determined for a superposition code used by one or more network nodes configured to perform compression operations. The set of channel coding rates is communicated to the one or more network nodes configured to perform compression operations.

BRIEF DESCRIPTION OF THE DRAWINGS

For a more complete understanding of the disclosed embodiments and their features and advantages, reference is now made to the following description, taken in conjunction with the accompanying drawings, in which:

FIG. 13 is a block diagram illustrating certain embodiments of a core network node.

DETAILED DESCRIPTION

Figure 1:
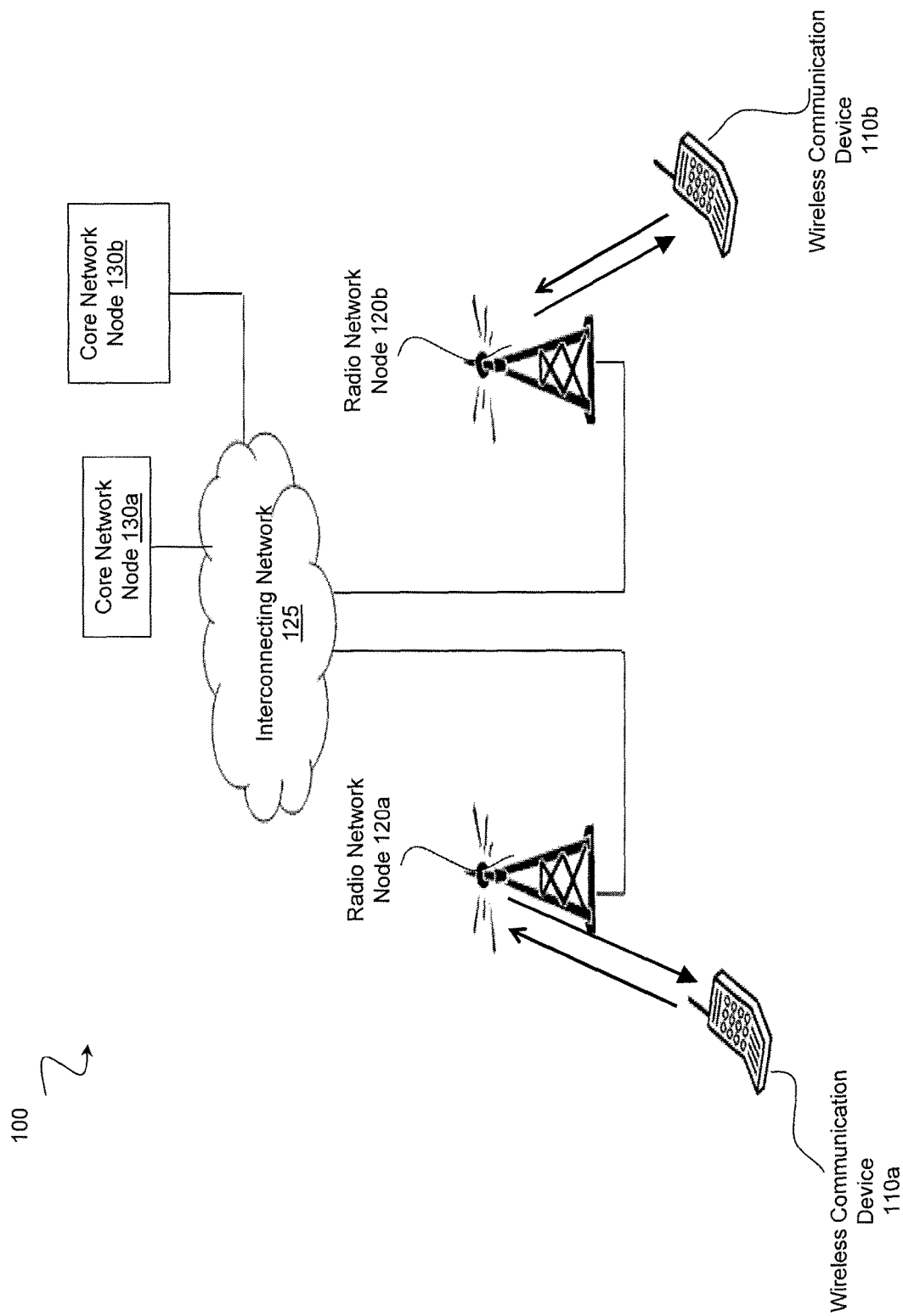
FIG. 1 is a block diagram illustrating an example of a wireless network that includes one or more wireless devices and a plurality of network nodes.

Increasing growth in data traffic requires wireless mesh network designs that can provide higher data rates, better energy efficiency, and better robustness. These networks can currently operate close to their per-link capacity, and further improvements may only be achieved by deploying more advanced approaches that optimize network behavior. Such advanced approaches may require a departure from the point-to-point view of a wireless network, and instead may require exploiting the broadcast feature of wireless medium that allows multiple nodes to hear a node transmission. Instead of treating such transmissions as interference at relays, these signals can be exploited via more advanced relaying/encoding schemes, thus boosting network performance.

In certain embodiments, a short message noisy network coding with rate splitting (SNNC-RS) scheme is described, in which a relay performing short message noisy network coding (SNNC) will, once it determines the compression index it wants to send, use superposition coding to encode that compression index. As a result, two "parts" of the quantization index will each be transmitted at a lower rate using different codebooks. One of the new, lower rates will be chosen such that the channel from the SNNC-RS relay to a decode-and forward (DF) relay can be reliably decoded at such rate. This will enable a DF relay to decode one part of the quantization index and hence cancel a part of the interference. Throughout the present disclosure, the terms compression index and quantization index may be used interchangeably.

The present disclosure may be readily generalized to cases in which multiple DF nodes wish to partially decode interference created by the SNNC-RS relay. Furthermore, the present disclosure may be exploited in any suitable network scenario in which data is sent through relays. For example, certain embodiments may be applicable to mesh networks and full or half-duplex networks, including those with or without multiple antennas. Therefore, the present disclosure may apply to wireless networks in general, and to particular applications such as multihop backhaul, network-assisted device to device communications, cellular networks with relays, and any other suitable applications.

A common approach to transfer data in a multihop network is via store-and-forward (SF), also commonly referred to as routing. In SF, data is transmitted from a source node to a destination node through relay nodes positioned on a predetermined route. Each node on the route receives data only from its immediate predecessor and forwards it to the next node on the route. All other signals are treated as noise. The network performance (e.g., data throughput, energy efficiency, reliability) can be significantly improved by deploying more advanced cooperative strategies, including: DF, compress-and-forward (CF), noisy network coding (NNC), also known as quantize-map-and-forward (QMF), and SNNC.

While DF outperforms SF, it shares the requirement of SF that each relay on the route is decoding the transmitted data. This requirement can drastically decrease the transmission rate if the link over which a relay is receiving data is weak. CF, NNC and SNNC, however, do not require the relay to decode. Instead, the relay compresses the received signal and forwards the obtained compression index, or information about the index. It has recently been shown in the literature that NNC and SNNC can bring wireless network performance close to its capacity. The drawback of these compression schemes, unlike DF, is that the compression noise is accumulated and propagated in the network. In contrast, DF does not suffer from this problem because noise is cleared out at every relay via decoding. Thus, DF and compression-based schemes have complementary advantages and drawbacks, and using them in combination may result in performance benefits. When applied together in a network, these cooperative schemes can fully adapt to network topology and channel conditions, and take full advantage of both approaches, thus boosting network performance. Consequently, it has recently been shown that mixed cooperative strategies in which relays in favorable positions perform DF and the rest of the relays perform SNNC can outperform schemes in which only NNC is used at all relays. This disclosure contemplates an approach that improves the rate performance of existing mixed DF-SNNC cooperative strategies.

Existing mixed cooperative strategies in networks having nodes performing DF and SNNC may use block transmission schemes in which multiple blocks are used to send each message (i.e., data). In some embodiments, to achieve transmission rate R, B messages each carrying nR bits are sequentially sent over B+1 blocks. In some embodiments, to achieve transmission rate R from one node to another node in a network with K nodes, B messages each carrying nR bits are sequentially sent over B+K−1 blocks. In each block, the source encodes the message it wishes to send in a codeword of length n, and transmits such that its power constraint is satisfied. In each block, upon receiving n symbols, a relay quantizes its received signal (of length n) with rate $R_q$ using vector quantization. It then encodes the index of the obtained quantized signal and sends out the obtained codeword at quantization rate $R_q$. After receiving all B+1 blocks (or B+K−1 blocks), the destination decodes the desired messages and quantization indexes of all relays.

FIG. 1 is a block diagram illustrating embodiments of a network 100 that includes one or more wireless devices 110, radio network nodes 120, and core network nodes 130. The present disclosure contemplates that network 100 may be any suitable type of network. As one example, in certain embodiments network 100 may include additional radio network nodes 120 suitably arranged such that network 100 is a multihop relay network. A wireless device 110 may communicate with a radio network node 120 over a wireless interface. For example, wireless device 110a may transmit wireless signals to radio network node 120a and/or receive wireless signals from radio network node 120a. The wireless signals may contain voice traffic, data traffic, control signals, and/or any other suitable information.

Radio network nodes 120 may interface with interconnecting network 125. Interconnecting network 125 may refer to any interconnecting system capable of transmitting audio, video, signals, data, messages, or any combination of the preceding. Interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless devices 110. Wireless devices 110 may exchange certain signals with core network node 130 using the non-access stratum layer. In non-access stratum signaling, signals between wireless devices 110 and core network node 130 may be transparently passed through the radio access network. Example embodiments of wireless device 110, radio network node 120, and core network node 130 are described with respect to FIGS. 11, 12, and 13, respectively.

As illustrated in FIG. 1, network 100 may represent an environment in which particular embodiments described herein may be employed. For example, the radio network nodes 120 or core network nodes 130 illustrated in FIG. 1 may be relay network nodes, such as the relay network nodes described below in FIGS. 2-5. More particularly, in certain embodiments network node 120a may be a network node configured to perform DF operations, and network node 120b may be configured to perform SNNC-RS operations, as is illustrated below in relation to FIG. 4. In certain embodiments, network 100 may contain additional network nodes 120 or core network nodes 130, such that any suitable number of network nodes 120 or core network nodes 130 may perform DF or SNNC-RS in any suitable configuration.

Figure 2:
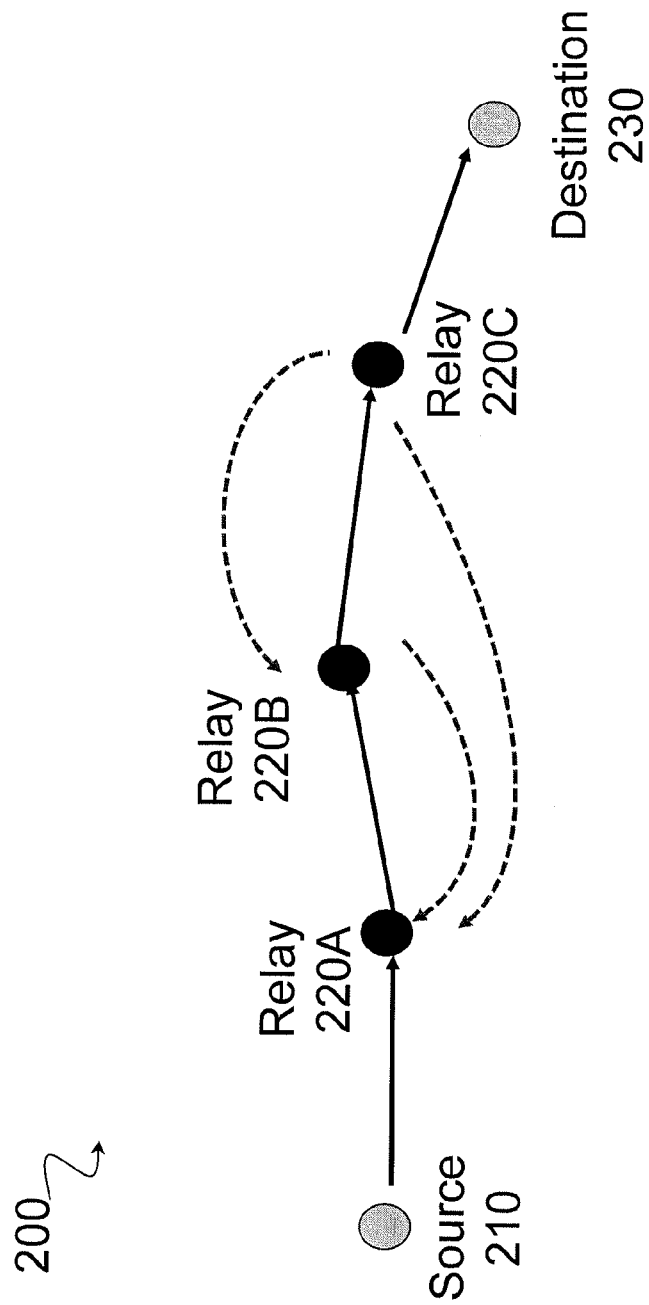
FIG. 2 is a schematic diagram of a multihop wireless mesh network.

FIG. 2 is a schematic diagram of a multihop network 200. Multihop network 200 illustrated in FIG. 2 includes one source node 210, a plurality of relay network nodes 220A, 220B, and 220C, and one destination node 230. As illustrated in FIG. 2, relay network nodes 220A, 220B, and 220C are DF nodes. A relay, such as relay node 220B, decodes a message based on signals received from all "upstream" nodes, such as relay node 220A. At the same time, although all relays simultaneously transmit, "downstream" relays, such as relay node 220C, do not cause interference to the upstream relays because the latter ones know the messages sent by the downstream relays and can cancel created interference. Therefore, subsequent relays on the route do not cause interference to the previous ones. However, when some of the relays do not decode and instead compress their signals via SNNC, such interference cancellation at DF relays is no longer possible. This is because the obtained quantization index that is sent by an SNNC relay depends not only on the data but also on the noise received at that relay. Hence, DF nodes cannot exactly know the quantization index. This can significantly decrease the rate at DF relays and thus overall performance.

The present disclosure contemplates various embodiments that may improve on this problem. In certain embodiments, certain drawbacks of the mixed DF-SNNC cooperative strategy are overcome using an SNNC-RS scheme that allows DF relays to partially decode interference created by SNNC relays. In certain embodiments, superposition coding may be incorporated into the SNNC encoding. In superposition coding, to send a message of rate R, the message is split into two messages, each with lower rate. Each of the two messages is then separately encoded (if the channel is Gaussian), and obtained codewords are summed up and sent together into the channel.

Figure 3:
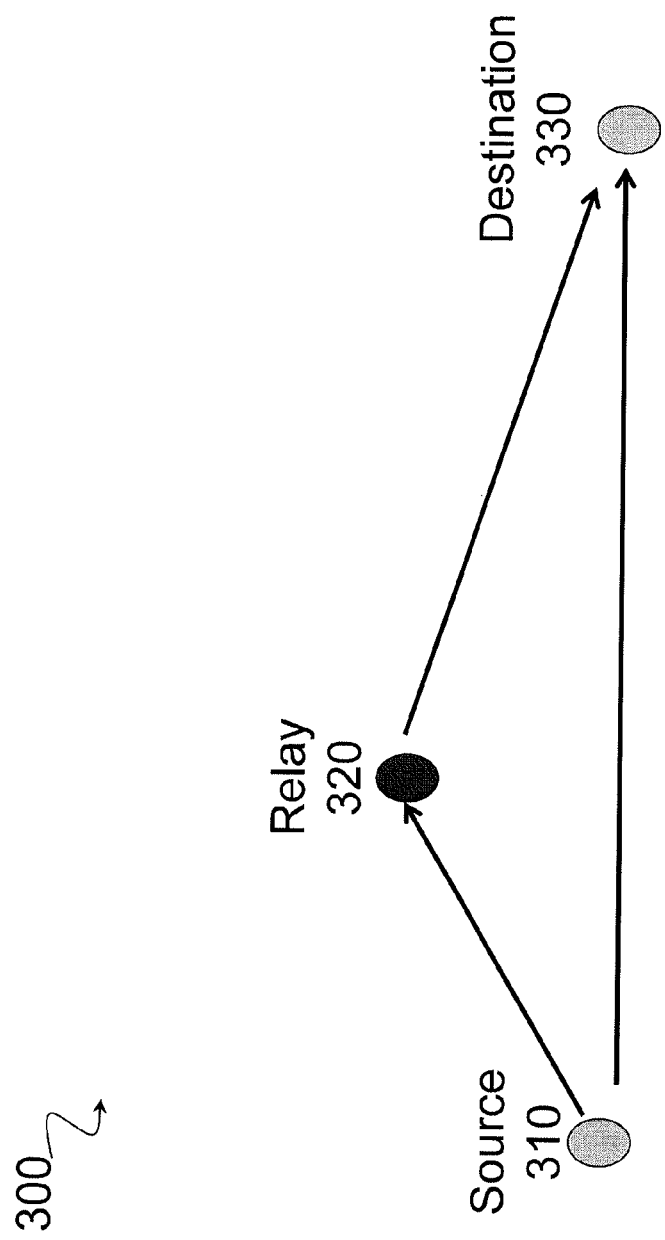
FIG. 3 is a schematic diagram of a single-relay network configured to perform a short message noisy network with rate splitting encoding scheme in accordance with certain embodiments.

FIG. 3 is a schematic diagram of a single relay network 300 configured to perform SNNC-RS, in accordance with certain embodiments. Network 300 illustrated in FIG. 3 includes one data source 310, one relay node 320, and one destination node 330. In certain embodiments, relay node 320 may be configured to perform an SNNC-RS encoding scheme, in accordance with certain embodiments.

In certain embodiments, network 300 may transmit messages. As described above, B messages may be transmitted over B+1 blocks. In each block, source 310 encodes one of the messages it wants to send, using a codeword of length n and transmits it. At the end of a block, relay node 320 quantizes the observed signal of length n with quantization rate $R_q$ using vector quantization. Relay node 320 thus obtains the quantization index denoted q, where $q \in \{1, \ldots, 2^{nR_q}\}$. To encode the index, relay node 320 splits the quantization index into two indexes with rates $R_{q1}$ and $R_{q2}$, such that $R_q = R_{q1} + R_{q2}$. Relay node 320 then encodes each of the two indexes separately using two independent codebooks of length n. After summing them up, relay node 320 sends the obtained codeword into the channel.

Destination 330 decodes the messages and the two quantization indexes. A decoder at destination node 330 that decodes the data sent by SNNC-RS may use different decoding schemes. For example, destination node 330 may use backward decoding, joint decoding, sliding-window decoding, or any other suitable decoding scheme.

In the single-relay network shown in FIG. 3, there is no rate gain from the SNNC-RS strategy described herein because there are no other relays that can benefit from rate-splitting.

Figure 4:
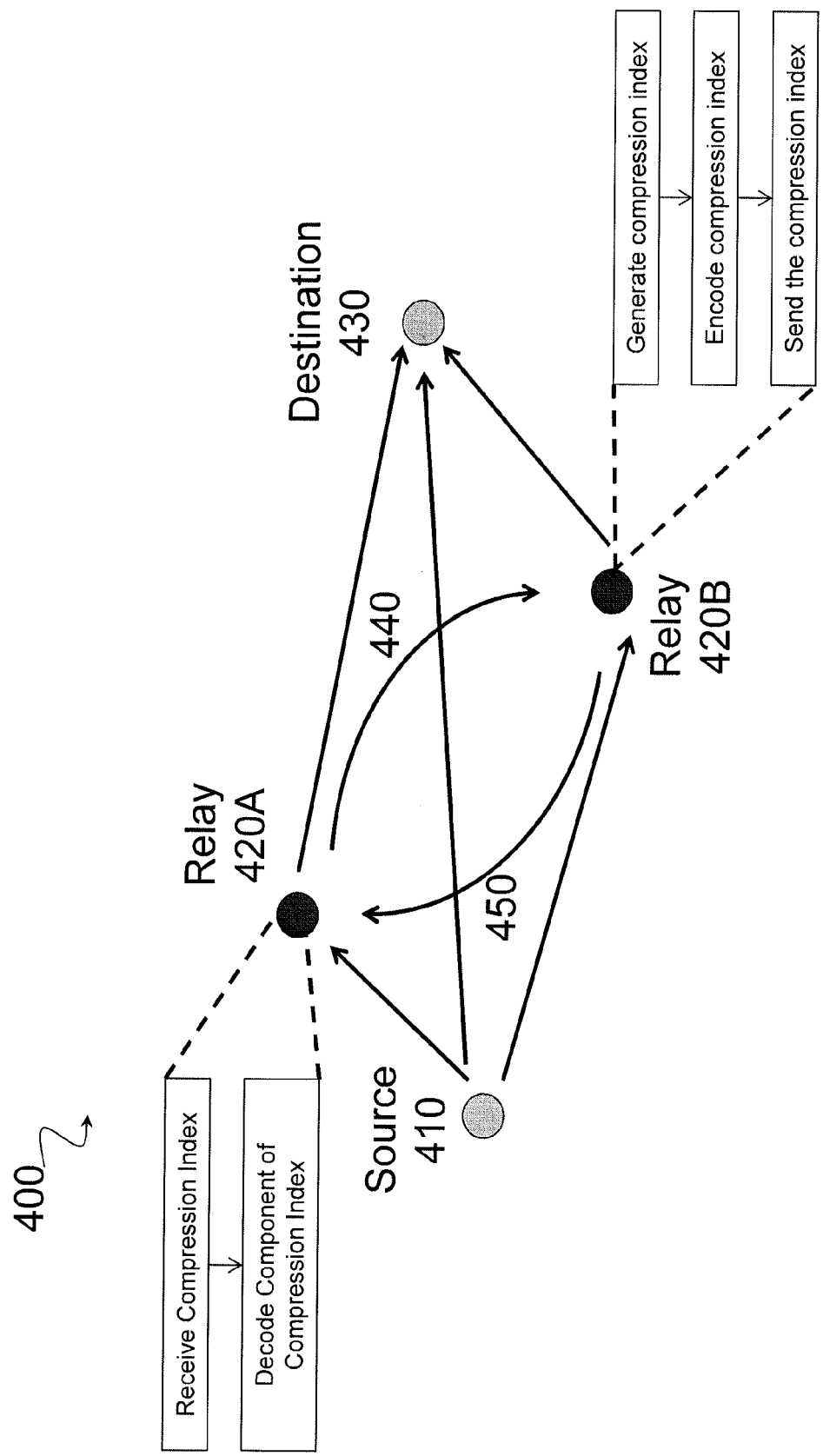
FIG. 4 is a schematic diagram of a two-relay network, in which one relay performs decode-and-forward and one relay performs short message noisy network coding with rate splitting, in accordance with certain embodiments.

FIG. 4 is a schematic diagram of a two-relay network 400, in which one relay performs DF and one relay performs SNNC-RS, in accordance with certain embodiments. In particular, FIG. 4 illustrates a network 400 having a data source 410, two relays 420A and 420B, and one destination node 430. In certain embodiments, relay network nodes 420A and 420B may be any suitable type of radio network node. For example, relay network nodes 420A and 420B may be one of the types of radio network nodes described below in relation to FIG. 12. In certain embodiments, network 400 may be larger, including many relays performing SNNC and/or DF, and the same steps as described here may be performed at each of these relays. As described above, it has been shown that a mixed cooperative strategy in which a first relay performs DF and a second relay performs SNNC (without rate splitting) can outperform other cooperative strategies. Embodiments of the present disclosure may improve such an arrangement by using SNNC-RS. The choice of rates $R_{q1}$ and $R_{q2}$ and operation at a DF relay are considered as follows.

In certain embodiments, relay node 420A may perform DF, and relay node 420B may perform SNNC-RS. This may allow relay node 420A to decode part of the quantization index sent by relay node 420B, thereby increasing the rate achievable at relay node 420A and thus improving the overall performance of network 400. As described above in relation to FIG. 3, and described in more detail below, relay node 420B may perform SNNC-RS. In certain embodiments, upon receiving a data transmission over path 440, relay node 420B generates a compression index, encodes the determined compression index, and sends the compression index to relay node 420A (illustrated by path 450).

In certain embodiments, to perform rate splitting, the SNNC-RS relay node 420B first determines the two lower code rates $R_{q1}$ and $R_{q2}$. Relay node 420B may choose the rate $R_{q1}$ to guarantee that the DF relay can reliably decode the part of the quantization index encoded at rate $R_{q1}$. In certain embodiments, the channel may be additive (real) Gaussian with white noise of variance $N_0$. Relay node 420B may choose $R_{q1}$ such that relay node 420A can decode both the message sent by data source 410 and the part of the quantization index sent by relay node 420B. In certain embodiments, relay node 420A may perform sequential decoding, in which relay 420A first decodes part of the quantization index and then decodes the source data. This bounds rate $R_{q1}$ according to the following equation:

$$R_{q1} < \log\left(1 + \frac{a h_{32}^2 P_3}{N_0 + \bar{a} h_{32}^2 P_3 + h_{12}^2 P_1}\right)$$

Wherein:
$P_1$ is the source 410 transmit power;
$P_3$ is the relay node 420B transmit power;
$h_{32}$ is the channel gain relay node 420B-relay node 420A;
$h_{12}$ is the channel gain source-relay node 420A; and
$\alpha$ is the parameter that needs to be optimized such that the total source-destination rate is maximized. In certain embodiments, this optimization can be performed at destination node 430, and may require destination node 430 to have full knowledge of channel gains.

In certain embodiments, relay node 420A may perform joint decoding. In such circumstances, equivalent multiple-access channel (MAC) rate bounds can be written.

The SNNC-RS encoding strategy described above may be readily generalized to the case in which rate-splitting is performed to allow a set of DF nodes to partially decode interference. In certain embodiments, the SNNC-RS relay node may aim to reduce interference at N DF nodes. An SNNC-RS relay node may use N-level superposition code to facilitate partial decoding at different rates at the DF nodes. For example, the SNNC-RS relay node may use superposition coding with (N+1) levels. More specifically, the SNNC-RS may split its quantization index into (N+1) parts, and encode part i with rate $R_{qi}$ such that:

$$R_q = \sum_{i=1}^{N+1} R_{qi},$$

Where $$R'_j = \sum_{i=1}^{j} R_{qi}$$

is the rate decodable by the jth DF node, for j=1, 2, ..., N.

As one example, suppose N DF relays are ordered such that relay 1 can decode part of the quantization rate at the lowest rate, and relay N can decode at the highest rate. In such circumstances, an SNNC-RS relay node will choose $R_{q1}$ to guarantee that relay 1, based on its received signal, can reliably decode the part of the quantization index denoted $q_1$ encoded at rate $R_{q1}$. As in the case of the two relays described above and illustrated in FIG. 4, rate $R_{q1}$ depends on whether the DF relay uses sequential or joint decoding, and on the received SINR ratio. Then, the SNNC-RS relay chooses $R_{q2}$ such that relay 2 can decode $q_1$, as well as the quantization index denoted $q_2$ encoded at rate $Rq_2$. Therefore, the total rate at which relay 2 decodes part of the quantization index is $R'_2$. Continuing in the same fashion, relay N decodes indexes $q_1, \ldots, q_N$, at a total rate of $R'_N$. The last index $q_{N+1}$ is encoded with the last level of the superposition code at rate $R_{N+1}$, and is not decoded by any of the N DF nodes. It is only decoded by the intended receiver.

In certain embodiments, optimal values for $R_1, \ldots, R_{N+1}$ may be obtained by maximizing the end-to-end rate between a source and a destination, such as source 410 and destination 430 illustrated in FIG. 4. This optimization may be done by a central node that has full knowledge of the channel gains in the network. In certain embodiments, the optimization may be done by the destination node 430. In certain embodiments, optimizing the channel coding rates may include computing an optimal power allocation for two or more component codes of the superposition code used by each relay node that performs CF.

As described above, mixed cooperative strategies of DF and SNNC can outperform schemes in which all relays use the same cooperative strategy. The reason for this is that no single cooperative scheme is optimal for all relay positions and channel conditions. Instead, the most suitable cooperative scheme depends on the relative position and current channel conditions at the relay. Thus, it may vary from node to node. As described above, the use of SNNC-RS in accordance with certain embodiments may further improve the rate performance of a mixed DF and SNNC cooperative strategy by allowing DF relay nodes to partially decode interference created by SNNC relays. This, in turn, allows DF relays to decode source data at a higher rate, thereby increasing the achievable rate in the network.

Figure 5:
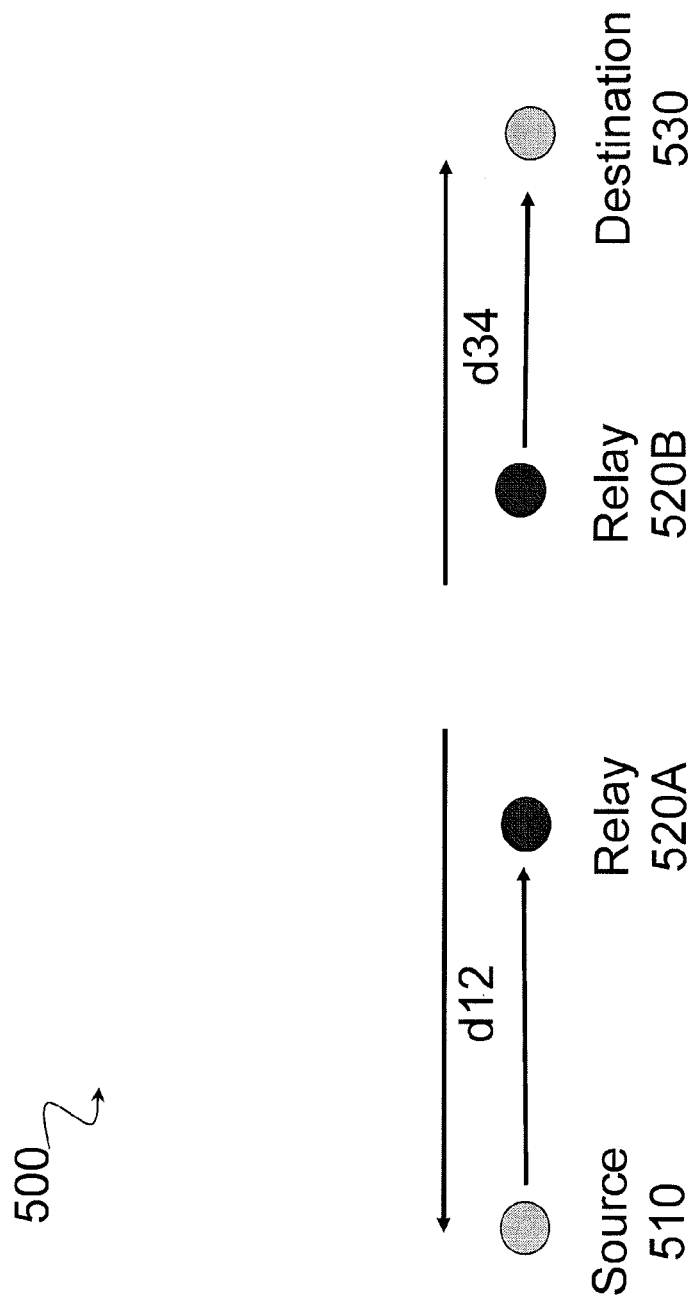
FIG. 5 is a schematic diagram of an example two-relay network in which all nodes are on the line, in accordance with certain embodiments.

FIG. 5 is a schematic diagram of an example two-relay network 500 in which all nodes are on the same line. Network 500 includes a source 510, a first relay node 520A, a second relay node 520B, and a destination node 530. In certain embodiments, relay node 520A may perform DF and relay node 520B may perform SNNC-RS.

Figure 6:
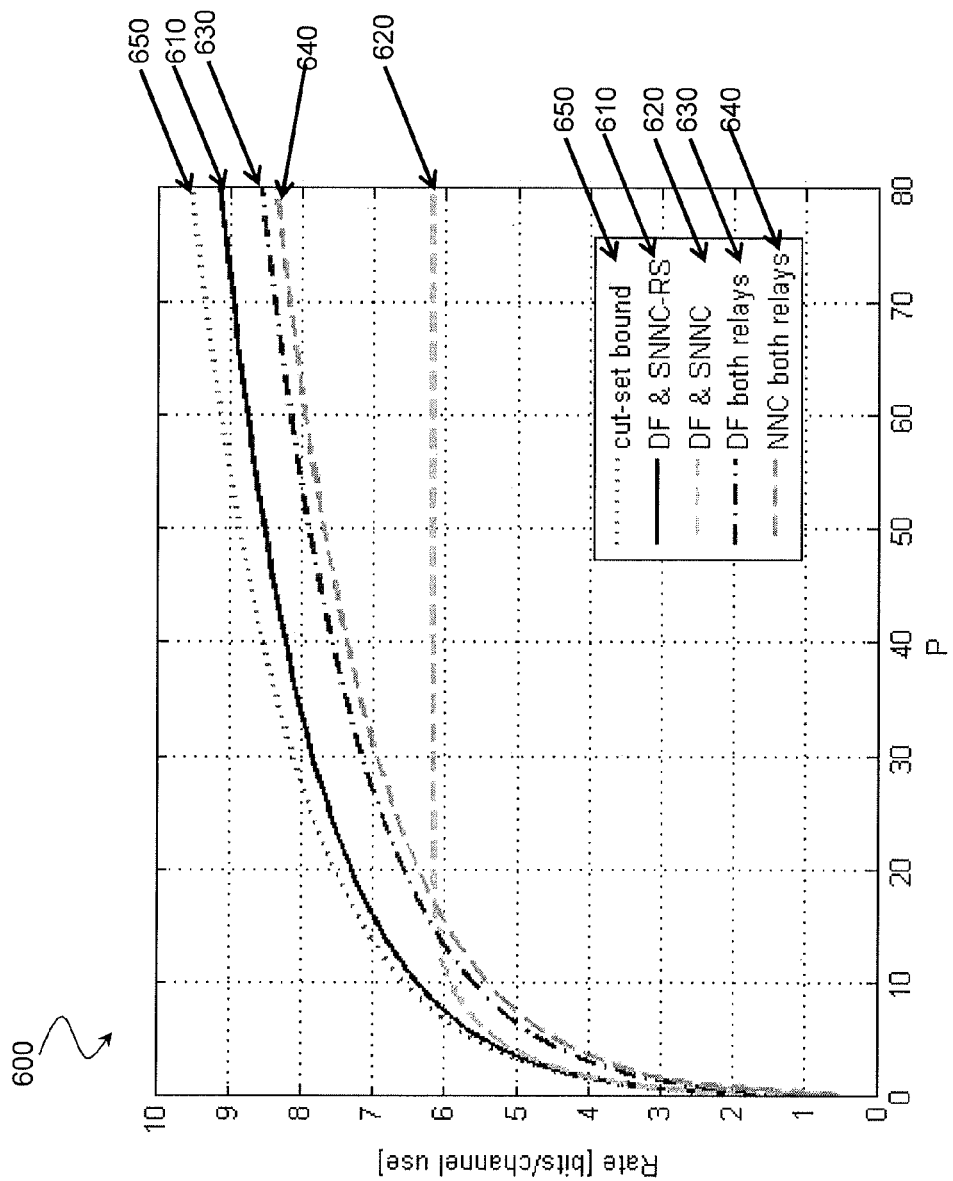
FIG. 6 is a graphical rate comparison of the short message noisy network with rate splitting encoding scheme described herein with other cooperative schemes.

FIG. 6 is a graphical rate comparison of the SNNC-RS encoding scheme described herein with other cooperative schemes. In FIG. 6, the obtained rate of the scheme described herein is compared with other cooperative schemes for an example scenario in which all four nodes are on the line, such as the one illustrated in FIG. 5.

FIG. 6 illustrates obtained achievable rates plotted as a function of the distance between relay node 520B and destination 530, as illustrated in FIG. 5. Line 610 denotes the rate performance of the described scheme using DF and SNNC-RS. Line 620 shows the rate of the same scheme but without rate splitting. Line 630 shows the rate of the scheme in which both relays perform DF. Line 640 shows the rate of the scheme in which both relays perform NNC. Line 650 shows the cut-set boundary.

As demonstrated in FIG. 6, the rate performance increases in the DF and SNNC-RS scheme described above for a network configuration such as the one illustrated in FIG. 5. In certain embodiments, as a network grows larger, with a larger number of DF nodes being able to decode interference due to the described SNNC rate-splitting encoding scheme, the gains can be expected to get larger.

Figure 7:
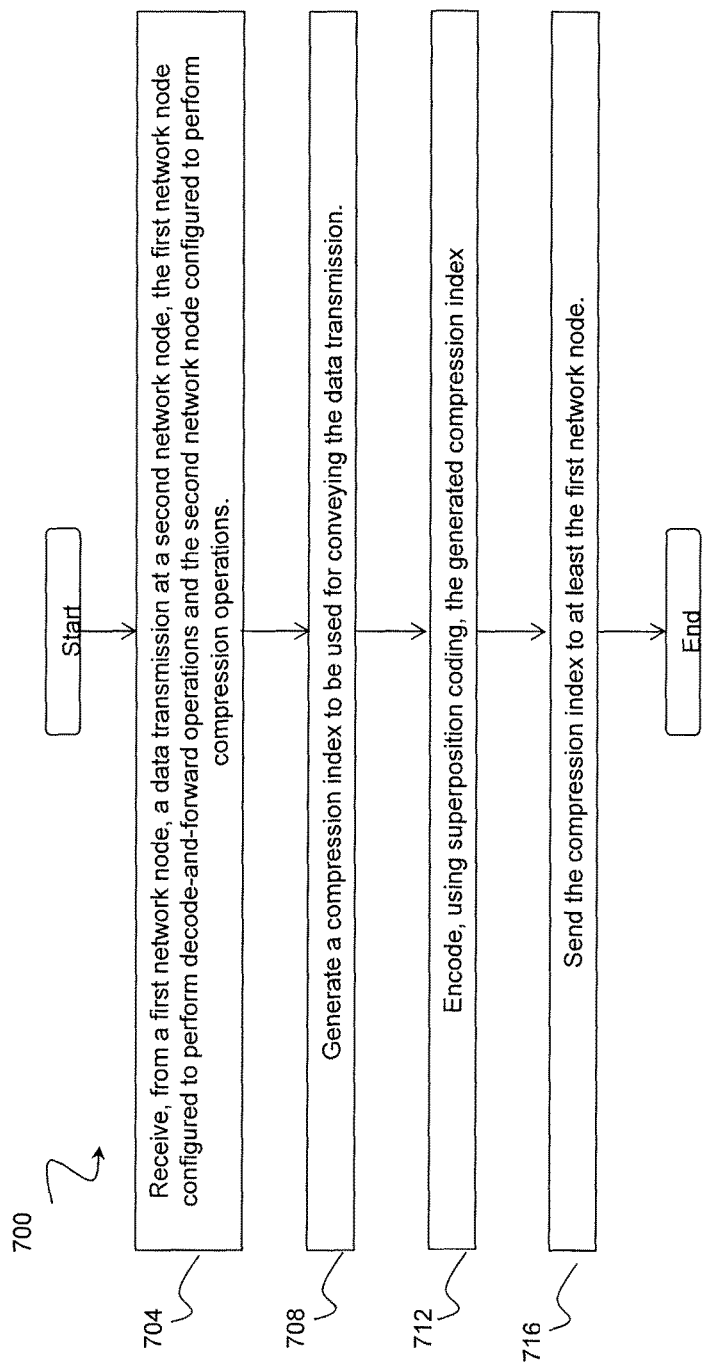
FIG. 7 is a flow chart illustrating an example method in a network node, according to an embodiment.

FIG. 7 is a flow chart illustrating an example method 700 in a network node, according to an embodiment. The method begins at step 704, where a data transmission from a first network node is received at a second network node. In certain embodiments, the first network node may be configured to perform DF operations, and the second network node may be configured to perform compression operations, such as SNNC-RS. In certain embodiments, the first network node and the second network nodes may be relay nodes in a multi-hop wireless mesh network. At step 708, the second network node generates a compression index. In certain embodiments, the compression index is used for conveying the data transmission.

At step 712, the generated compression index is encoded using superposition coding. At step 716, compression index is sent to at least the first network node. In certain embodiments, the compression index may also be sent to a destination node.

Figure 8:
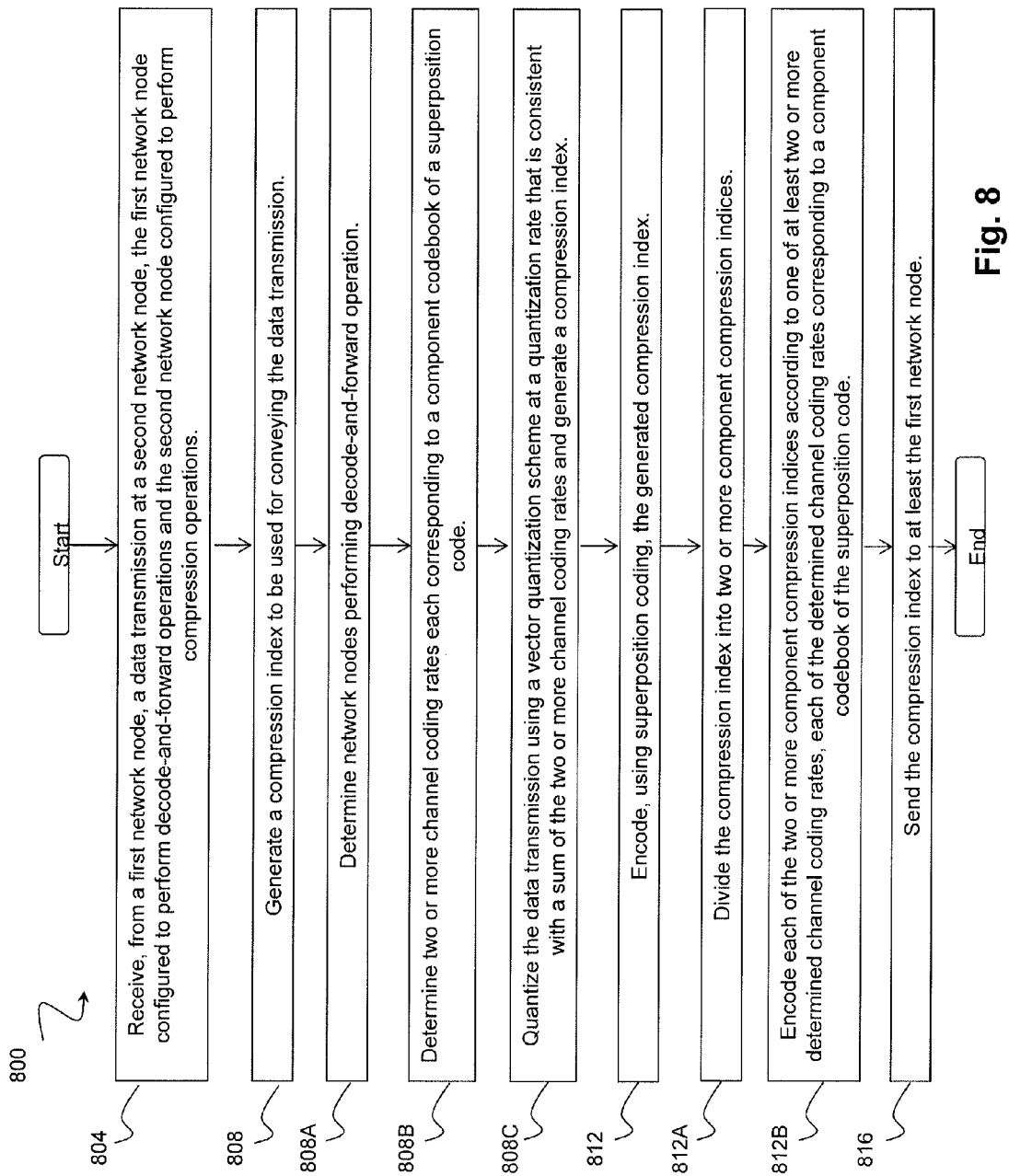
FIG. 8 is a flow chart illustrating an example method in a network node, according to an embodiment.

FIG. 8 is a flow chart illustrating an example method 800 in a network node, according to an embodiment. The method begins at step 804, where a data transmission from a first network node is received at a second network node. In certain embodiments, the first network node may be configured to perform DF operations, and the second network node may be configured to perform compression operations, such as SNNC-RS. In certain embodiments, the first network node and the second network node may be relay nodes in a multi-hop wireless mesh network. At step 808, a compression index is generated. In certain embodiments, the compression index may be used for conveying the data transmission.

In generating the compression index at step 808, the method illustrated in FIG. 8 may include steps 808A, 808B, and 808C. At step 808A, network nodes performing decode-and-forward operation are determined. In certain embodiments, there may be any suitable number of DF nodes. At step 808B, two or more channel coding rates are determined. In certain embodiments, each channel coding rate may correspond to a component codebook of a superposition code. In certain embodiments, at least one of the determined channel coding rates is able to be decoded by the first network node. At step 808C, the data transmission is quantized using a vector quantization scheme at a quantization rate that is consistent with a sum of the two or more channel coding rates. In certain embodiments, the channel coding rates may be determined based at least in part on channel gains in the network.

At step 812, the generated compression index is encoded using superposition coding. In encoding the compression index at step 812, the method illustrated in FIG. 8 may include steps 812A and 812B. At step 812A, the compression index is divided into two or more component compression indices. At step 812B, each of the two or more component compression indices are encoded according to one of at least two or more determined channel coding rates. In certain embodiments, each of the determined channel coding rates may correspond to a component codebook of the superposition code. At step 816, the compression index is sent to at least the first network node. In certain embodiments, the compression index may also be sent to a destination node.

Figure 9:
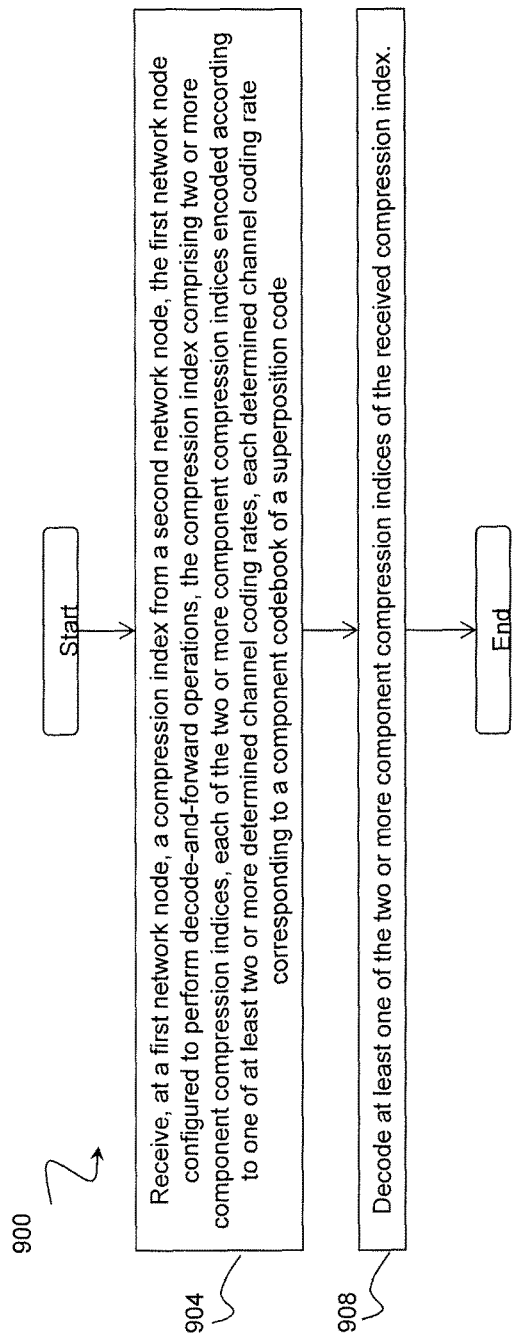
FIG. 9 is a flow chart illustrating an example method in a network node, according to an embodiment.

FIG. 9 is a flow chart illustrating an example method 900 in a network node, according to an embodiment. The method begins at step 904, where a first network node receives a compression index from a second network node. In certain embodiments, the first and second network nodes may be relay nodes in a multi-hop wireless mesh network. In certain embodiments, the first network node may be configured to perform decode-and-forward operations and the second network node may be configured to perform compression operations. In certain embodiments, the compression index may include two or more component compression indices. Each of the two or more component compression indices may be encoded according to one of at least two or more determined channel coding rates. The determined channel coding rates may correspond to a component codebook of a superposition code. In certain embodiments, the two or more channel coding rates are determined based at least in part on channel gains in the network. At step 908, at least one of the two or more component compression indices of the received compression index is decoded. In certain embodiments, decoding at least one of the two or more component compression indices of the received compression index may allow for cancellation of interference.

Figure 10:
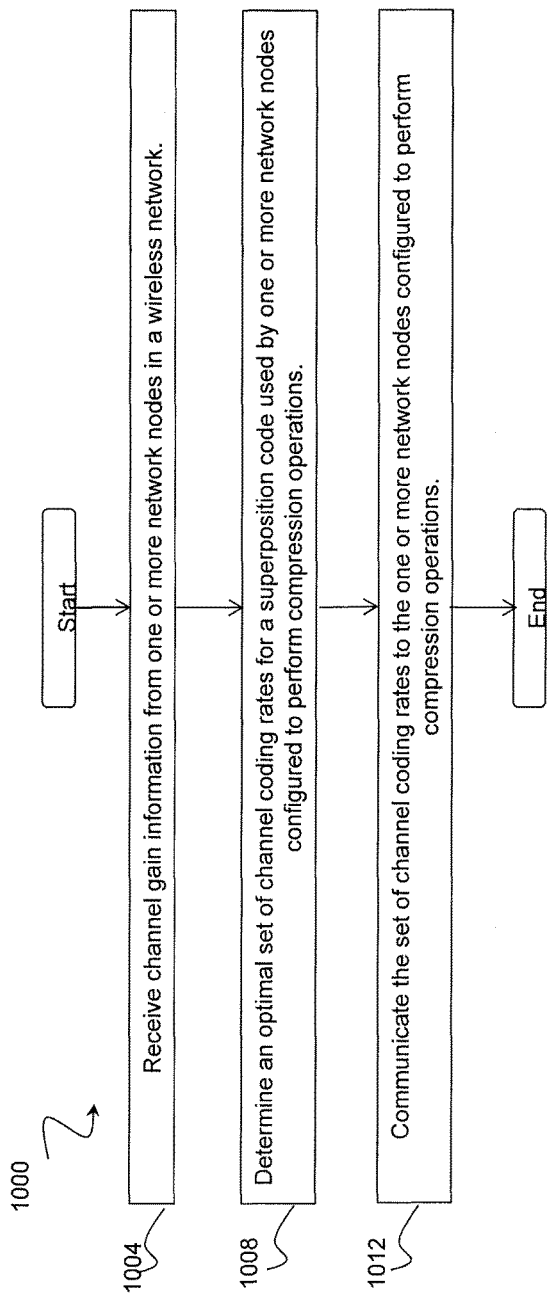
FIG. 10 is a flow chart illustrating an example method in a network node, according to an embodiment.

FIG. 10 is a flow chart illustrating an example method 1000 in a network node, according to an embodiment. The method begins at step 1004, when channel gain information from one or more network nodes in a wireless network is received. At step 1008, an optimal set of channel coding rates for a superposition code used by one or more network nodes configured to perform compression operations is determined. In certain embodiments, determining an optimal set of channel coding rates may include determining a power allocation for two or more component codes of the superposition code that maximizes an end-to-end throughput from a source to a destination node. At step 1012, the set of channel coding rates is communicated to the one or more network nodes configured to perform compression operations. In certain embodiments, the one or more network nodes may perform CF, NNC, SNNC, or SNNC-RS.

Figure 11:
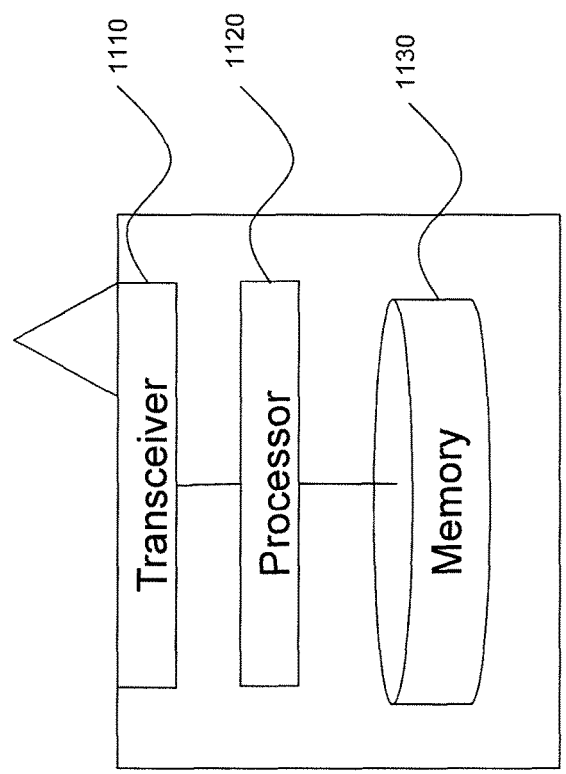
FIG. 11 is a block diagram illustrating certain embodiments of a wireless device.

FIG. 11 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1110, processor 1120, and memory 1130. In some embodiments, transceiver 1110 facilitates transmitting wireless signals to and receiving wireless signals from radio network node 120 (e.g., via an antenna), processor 1120 executes instructions to provide some or all of the functionality described above as being provided by wireless device 110, and memory 1130 stores the instructions executed by processor 1120.

Processor 1120 may include any suitable combination of hardware and software implemented in one or more modules to execute instructions and manipulate data to perform some or all of the described functions of wireless device 110. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 11 that may be responsible for providing certain aspects of the wireless device's functionality, including any of the functionality described above and/or any additional functionality (including any functionality necessary to support the solution described above).

Figure 12:
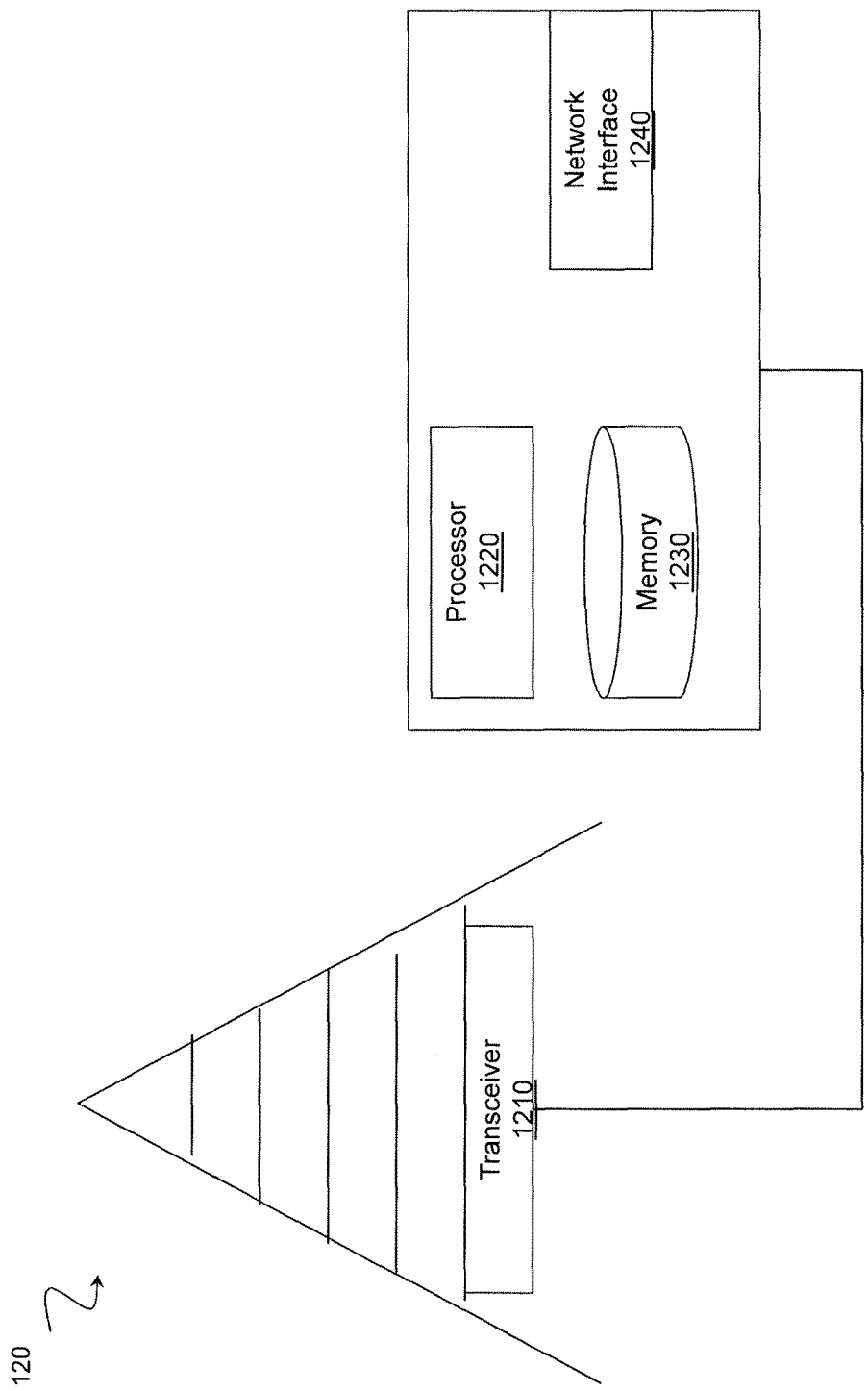
FIG. 12 is a block diagram illustrating certain embodiments of a radio network node.

FIG. 12 is a block diagram illustrating certain embodiments of a radio network node 120. Examples of radio network node 120 include an eNodeB, a node B, a base station, a wireless access point (e.g., a Wi-Fi access point), a low power node, a base transceiver station (BTS), transmission points, transmission nodes, remote RF unit (RRU), remote radio head (RRH), central network node, etc. Radio network nodes 120 may be deployed throughout network 100 as a homogenous deployment, heterogeneous deployment, or mixed deployment. A homogeneous deployment may generally describe a deployment made up of the same (or similar) type of radio network nodes 120 and/or similar coverage and cell sizes and inter-site distances. A heterogeneous deployment may generally describe deployments using a variety of types of radio network nodes 120 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

In certain embodiments, radio network node 120 may be a relay node configured to perform DF or SNNC-RS in a multihop wireless network, in accordance with certain embodiments described above. For example, a plurality of radio network nodes 120 performing a mixture of DF and SNNC-RS may be combined to perform certain embodiments described above in relation to FIG. 4.

Radio network node 120 may include one or more of transceiver 1210, processor 1220, memory 1230, and network interface 1240. In some embodiments, transceiver 1210 facilitates transmitting wireless signals to and receiving wireless signals from wireless device 110 (e.g., via an antenna), processor 1220 executes instructions to provide some or all of the functionality described above as being provided by a radio network node 120, memory 1230 stores the instructions executed by processor 1220, and network interface 1240 communicates signals to backend network components, such as a gateway, switch, router, Internet, Public Switched Telephone Network (PSTN), core network nodes 130, or a radio network controller, etc.

Processor 1220 may include any suitable combination of hardware and software implemented in one or more modules to execute instructions and manipulate data to perform some or all of the described functions of radio network node 120. In some embodiments, processor 1220 may include, for example, one or more computers, one or more central processing units (CPUs), one or more microprocessors, one or more applications, and/or other logic.

As described above, a network node 120 in a multihop wireless mesh network may be configured to establish a list of neighbor nodes that perform DF operation, determine two or more channel coding rates each corresponding to one of the component codebooks of a superposition code, quantize at least one received signal sample using a vector quantization scheme at a quantization rate that is consistent with the sum of the said channel coding rates, generate a quantization index, and encode the quantization index using the superposition code.

In some embodiments, the processor 1220 may be further configured, during the step of encoding the quantization index, to divide the quantization index into two or more component quantization indices, and encode each component quantization index by one of the component codebooks of the superposition code.

A central network node in a multi-hop wireless mesh network may include a radio subsystem comprising a transmitter and a receiver; and a processing subsystem associated with the radio subsystem and configured to receive channel gain information from all nodes in the network. The processing subsystem may be configured to compute an optimal set of channel coding rates for the superposition code used by each node that performs compress-and-forward (CF) operation, and send the optimal set of channel coding rates to each node in the network that performs CF operation.

In some embodiments, the processing subsystem is further configured, during the step of computing an optimal set of channel coding rates, to compute an optimal power allocation for two or more component codes of the superposition code used by each node that performs CF operation in order to maximize the end-to-end throughput from a source node to a destination node.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 1240 is communicatively coupled to processor 1220 and may refer to any suitable device operable to receive input for radio network node 120, send output from radio network node 120, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of radio network node 120 may include additional components beyond those shown in FIG. 12 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 13 is a block diagram illustrating certain embodiments of a core network node 130. Examples of core network nodes can include a mobile switching center (MSC), a serving GPRS support node (SGSN), a mobility management entity (MME), a radio network controller (RNC), a base station controller (BSC), and so on. The core network node includes processor 1320, memory 1330, and network interface 1340. In some embodiments, processor 1320 executes instructions to provide some or all of the functionality described above as being provided by the network node, memory 1330 stores the instructions executed by processor 1320, and network interface 1340 communicates signals to an suitable node, such as a gateway, switch, router, Internet, Public Switched Telephone Network (PSTN), radio network nodes 120, radio network controllers 120, core network nodes 130, etc.

Processor 1320 may include any suitable combination of hardware and software implemented in one or more modules to execute instructions and manipulate data to perform some or all of the described functions of the network node. In some embodiments, processor 1220 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processor 1320 and may refer to any suitable device operable to receive input for the network node, send output from the network node, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

Some embodiments of the present disclosure may provide one or more technical advantages. As an example, in some embodiments, the rate performance of cooperative strategies using mixed DF and SNNC relay nodes may be improved by using SNNC-RS, thereby allowing DF relays to partially decode interference created by SNNC relays. As a result, DF relays may be able to decode source data at a higher rate, thereby increasing the achievable rates in the network. As another example, the various embodiments described above may be exploited in a variety of network scenarios in which data is sent through relays, and therefore may apply to wireless networks in general, and in particular applications such as multihop backhaul, network assisted device to device communications, cellular networks with relays, and any other suitable application.

Some embodiments may benefit from some, none, or all of these advantages. Other technical advantages may be readily ascertained by one of ordinary skill in the art.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
SF Store-and-forward
DF Decode-and-forward
CF Compress-and-forward
NNC Noisy network coding
SNNC Short message NNC
SNNC-RS SNNC with rate splitting
QMF Quantize-map-and-forward

The invention claimed is:

1. A method for communicating data in a network node, comprising:
   receiving, from a first network node, a data transmission at a second network node, the first network node configured to perform decode-and-forward operations and the second network node configured to perform compression operations;
   generating a compression index to be used for conveying the data transmission;
   encoding, using superposition coding, the generated compression index; and
   sending the compression index to at least the first network node;
   wherein encoding, using superposition coding, the generated compression index comprises:
      dividing the compression index into two or more component compression indices; and
      encoding each of the two or more component compression indices according to one of at least two or more determined channel coding rates, each of the determined channel coding rates corresponding to a component codebook of the superposition code.

2. The method of claim 1, wherein generating a compression index to be used for conveying the data transmission comprises:
   determining network nodes performing decode-and-forward operation;
   determining two or more channel coding rates each corresponding to a component codebook of a superposition code; and
   quantizing the data transmission using a vector quantization scheme at a quantization rate that is consistent with a sum of the two or more channel coding rates.

3. The method of claim 2, wherein determining two or more channel coding rates each corresponding to a component codebook of a superposition code further comprises:
   determining at least one channel coding rate that is able to be decoded by the first network node.

4. The method of claim 2, wherein the two or more channel coding rates are determined based at least in part on channel gains in the network.

5. The method of claim 1, wherein at least one of the determined channel coding rates is able to be decoded by the first network node.

6. The method of claim 1, wherein the first and second network nodes comprise relay nodes in a multi-hop wireless mesh network.

7. A network node, comprising:
one or more processors and memory, the memory containing instructions executable by the one or more processors, whereby the one or more processors are operable to:
receive, from a first network node at a second network node, a data transmission at the second network node, the first network node configured to perform decode-and-forward operations and the second network node configured to perform compression operations;
generate a compression index to be used for conveying the data transmission;
encode, using superposition coding, the generated compression index; and
send the compression index to at least the first network node,
wherein to encode, using superposition coding, the generated compression index, the one or more processors are further operable to:
divide the compression index into two or more component compression indices; and
encode each of the two or more component compression indices according to one of at least two or more determined channel coding rates, each of the determined channel coding rates corresponding to a component codebook of the superposition code.

8. The network node of claim 7, wherein to generate a compression index to be used for conveying the data transmission, the one or more processors are further operable to:
determine network nodes performing decode-and-forward operation;
determine two or more channel coding rates each corresponding to a component codebook of a superposition code; and
quantize the data transmission using a vector quantization scheme at a quantization rate that is consistent with a sum of the two or more channel coding rates.

9. The network node of claim 8, wherein to determine two or more channel coding rates each corresponding to a component codebook of a superposition code, the one or more processors are further operable to:
determine that at least one channel coding rate is able to be decoded by the first network node.

10. The network node of claim 8, wherein the two or more channel coding rates are determined based at least in part on channel gains in the network.

11. The network node of claim 7, wherein at least one of the determined channel coding rates is able to be decoded by the first network node.

12. The network node of claim 7, wherein the first and second network nodes comprise relay nodes in a multi-hop wireless mesh network.

13. A method for data transmission in a network node, comprising:
receiving, at a first network node, a compression index from a second network node, the first network node configured to perform decode-and-forward operations, the compression index comprising two or more component compression indices, each of the two or more component compression indices encoded according to one of at least two or more determined channel coding rates, each determined channel coding rate corresponding to a component codebook of a superposition code; and
decoding at least one of the two or more component compression indices of the received compression index.

14. The method of claim 13, wherein decoding at least one of the two or more component compression indices of the received compression index results in cancellation of interference.

15. The method of claim 13, wherein the first network node and the second network node comprise relay nodes in a multi-hop wireless mesh network.

16. The method of claim 13, wherein the two or more channel coding rates are determined based at least in part on channel gains in the network.

17. The method of claim 13, wherein at least one of the two or more determined channel coding rates is able to be decoded by the first network node.

18. A network node, comprising:
one or more processors and memory, the memory containing instructions executable by the one or more processors, whereby the one or more processors are operable to:
receive, at a first network node, a compression index from a second network node, the first network node configured to perform decode-and-forward operations, the compression index comprising two or more component compression indices, each of the two or more component compression indices encoded according to one of at least two or more determined channel coding rates, each determined channel coding rate corresponding to a component codebook of a superposition code; and
decode at least one of the two or more component compression indices of the received compression index.

19. The network node of claim 18, wherein decoding at least part of the received compression index results in cancellation of interference.

20. The network node of claim 18, wherein the first network node and the second network node comprise relay nodes in a multi-hop wireless mesh network.

21. The network node of claim 18, wherein the two or more channel coding rates are determined based at least in part on channel gains in the network.

22. The network node of claim 18, wherein at least one of the two or more determined channel coding rates is able to be decoded by the first network node.

* * * * *